J. STEPHENSON.
Car Brake.

No. 26,626. Patented Dec. 27, 1859.

Witnesses: Michl Hughes. M. M. Livingston.

Inventor: John Stephenson.

UNITED STATES PATENT OFFICE.

JOHN STEPHENSON, OF NEW YORK, N. Y.

BRAKE FOR HORSE-CARS.

Specification of Letters Patent No. 26,626, dated December 27, 1859.

*To all whom it may concern:*

Be it known that I, JOHN STEPHENSON, of the city, county, and State of New York, have invented a new and Improved Brake for Horse-Cars, &c.; and I do hereby declare that the following is a full, clear, and exact description of the same, reference being had to the accompanying drawing, forming a part of this specification, in which—

Figure 1:
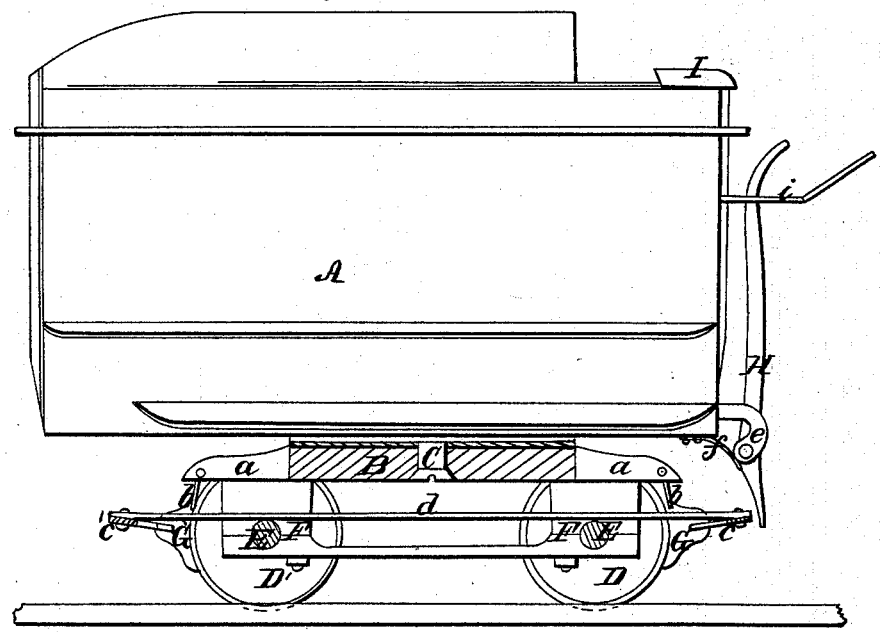
Figure 2:
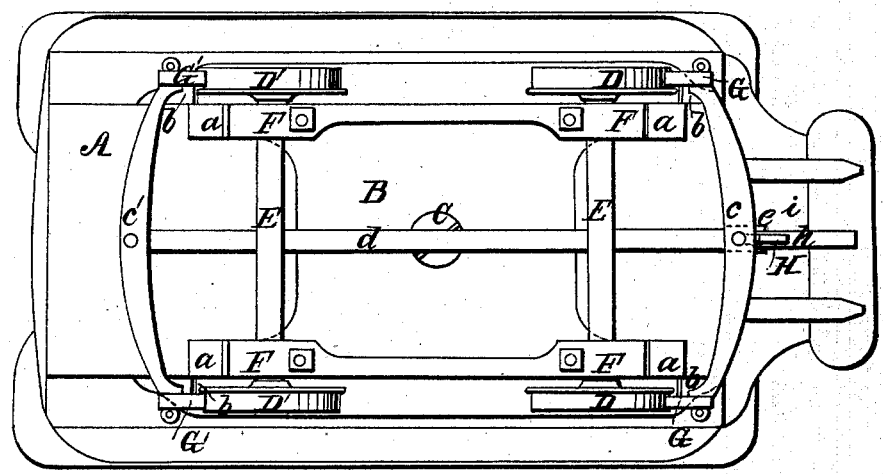

Figure 1 represents an elevation of my car with the truck and brake bars in section. Fig. 2 is an inverted plan of the same.

Similar letters of reference indicate corresponding parts in both figures.

This invention relates particularly to brakes applied to one-horse city cars. These cars are usually so constructed that the body of the car turns on the king bolt, and that at the termini of the route the driver is enabled to drive the horse around and to reverse the car without leaving his seat, which would be necessary if he had to unhitch the horse, and hitch him to the other end of the car, as is usually done with two-horse cars. Hitherto those reversible cars were made without brakes or so that the brakes could be used only in one direction; and my invention consists in arranging the brakes of a reversible car or vehicle in such a manner that the driver is enabled to operate the same with equal facility and by the same lever in whatever direction the car moves.

To enable those skilled in the art to make and use my invention I will proceed to describe it.

The body, A, of the car is attached to the platform, B, of the truck by means of the king bolt, C, in such a manner that it can be turned and its position reversed on the truck, so that when the car has arrived at the terminus of its route, the horse or horses can be driven around and the body of the car turned the other way without unhitching.

The truck rests on four wheels, D D', which are secured to axles, E, that turn in the axle boxes, F, in the usual manner. The platform, B, is furnished with projecting ears, $a$, and suspended from these ears by means of hooks, $b$, are the brake shoes, G G', one for each of the wheels, as clearly represented in the drawing. The shoes, G, on one pair of wheels are connected by a curved bar, $c$, and the shoes, G', by a similar curved bar, $c'$, and the two bars, $c\ c'$, are connected by a rod, $d$, of such a length that the shoes are kept at a small distance from the faces of the wheels when left to themselves. The outer edges of the curved bars, $c\ c'$, form portions of a circle described from the center of the king bolt, C.

The brake lever, H, is secured to the front side of the car body by means of a forked pendant, $e$, and a spring, $f$, throws the lower end of this lever back from the curved or segment bars, $c\ c'$. The upper end of the lever, H, extends through a slot, $h$, in the foot board, $i$, so that it can conveniently be reached from the driver's seat, I. By forcing the upper end of the brake lever out, its lower end is forced up on the segment bar, $c$, and the shoes, G, are pressed against the faces of the wheels, D, and as soon as the force exerted on the upper end of the lever relaxes the lower end of the same is thrown back from the segment bar, $c$, by the action of the spring, $f$, and the brakes are taken off.

When the car is reversed the lower end of the brake lever, H, together with the whole body of the car turns around the center of the king bolt, C, and it is brought in the proper position to act on the other segment bar, $c'$, in the same manner in which it acted in its former position on the segment bar, $c$, and by forcing out the upper end of the brake lever the shoes, G', are now applied to the wheel, D'.

By these means the driver is enabled to operate the brakes from his seat by means of the same lever in whatever direction the car may be turned.

Having thus fully described my invention what I claim as new, and desire to secure by Letters Patent, is:—

Arranging the brakes of a reversible car or other vehicle substantially as described so that the same can be applied from the driver's seat with equal facility in whatever direction the car or vehicle may be turned.

JOHN STEPHENSON.

Witnesses:
  MICH. HUGHES,
  MONTGOMERY M. LIVINGSTON.